Apr. 10, 1923.

H. STÜTING

ROLLING MILL

Filed Apr. 8, 1922

Inventor
Heinrich Stüting by *illegible signature*
Attorney.

Patented Apr. 10, 1923.

1,451,060

UNITED STATES PATENT OFFICE.

HEINRICH STÜTING, OF WITTEN-ON-THE-RUHR, GERMANY.

ROLLING MILL.

Application filed April 8, 1922. Serial No. 550,860.

*To all whom it may concern:*

Be it known that I, HEINRICH STÜTING, a citizen of Germany, residing at Witten-on-the-Ruhr, have invented certain new and useful Improvements in a Rolling Mill, of which the following is a specification.

My invention relates to spindle housings for pinions and the like.

In all continuous rolling mills heretofore known the arrangement of the drive for the pairs of rolls arranged in succession caused great difficulties. In continuous mills for solid sections the pairs of rolls arranged in succession are not staggered but are all arranged horizontally, so that the pinions appertaining to each pair of rolls are also provided with horizontal drive. This arrangement, however, is only feasible where the piece to be rolled can be displaced 90 degrees in curved guides when moving from one pass to the other. In continuous mills for hollow sections, it is impossible to thus displace the piece between two passes inasmuch as in the case, where a long mandrel is inserted in the piece, the section of the piece being reduced, the mandrel does not allow the piece to be thus turned, while, when no mandrel is inserted, that is, where only the diameter is reduced the hollow section such as a tube would be spoilt by being turned intermediate two passes. Therefore when rolling hollow sections, it is necessary to arrange the passes in staggered relation. However such an arrangement necessitates complicated drives and considerable wear.

In the continuous two high mills heretofore in use the pinions have to be disposed at an angle of 45° to the horizontal. In continuous universal mills the angle is 22½°. In the direction in which the pieces move, the driving shaft of the first housing extends to the right, that of the second housing to the left, and so on. Longitudinal shafts extend in parallel to the direction in which the pieces move, and drive the several pinions by means of bevel gears. These longitudinal shafts are connected with one another by a transverse shaft and bevel gears. The transverse shaft is driven by a motor either directly or by a belt drive. This driving arrangement besides being very cumbrous, requires great width.

All these drawbacks are obviated, according to the present invention, by means of spindle housing which is adapted for all kinds of continuous mills, no matter whether twin or universal rolling mills and whether solid or hollow sections be rolled. I effect this by arranging the pinion shafts radially. The radial shafts can be driven horizontally in every case, as each of these radial pinion shafts can be provided with this drive and staggered passes are obtained no matter which radial shaft be disposed in horizontal position. Therefore even with solid sections no turning of the pieces is necessary when moving from one pass to the one next succeeding. Moreover, instead of only a single pair of rolls (twin or universal) two pairs of rolls in staggered relation arranged at either side of the spindle housing can be driven from the horizontal drive connected with the said housing.

All these advantages are obtained by the radial or star-shaped arrangement of the pinion shafts which serve for transmitting power to the roll shaft by means of a coupling and to drive the rolls, exactly as in all other pinions.

In twin rolling mills four radial shafts connected by four bevel gears with a pitch cone angle of 90° will suffice. Preferably, however, eight radial shafts are provided as in universal mills, as the eight bevel gears of the pinions mesh with one another at the more favourable pitch cone angle of 45°.

Broadly the radial arrangement of the pinions allows to use any number of rolls with a corresponding number of pinions, so that it is not limited to the two and four roll system. Power is transmitted from the pinion shafts to the roll shafts by pairs of spur gears whose diameter is determined by the size of the rolls.

In the drawings affixed to this specification and forming part thereof a housing for two universal roll heads embodying my invention is illustrated diagrammatically by way of example. In the drawings Fig. 1 is a section of the spindle housing on line 1—1 in Fig. 2.

Figure 1:
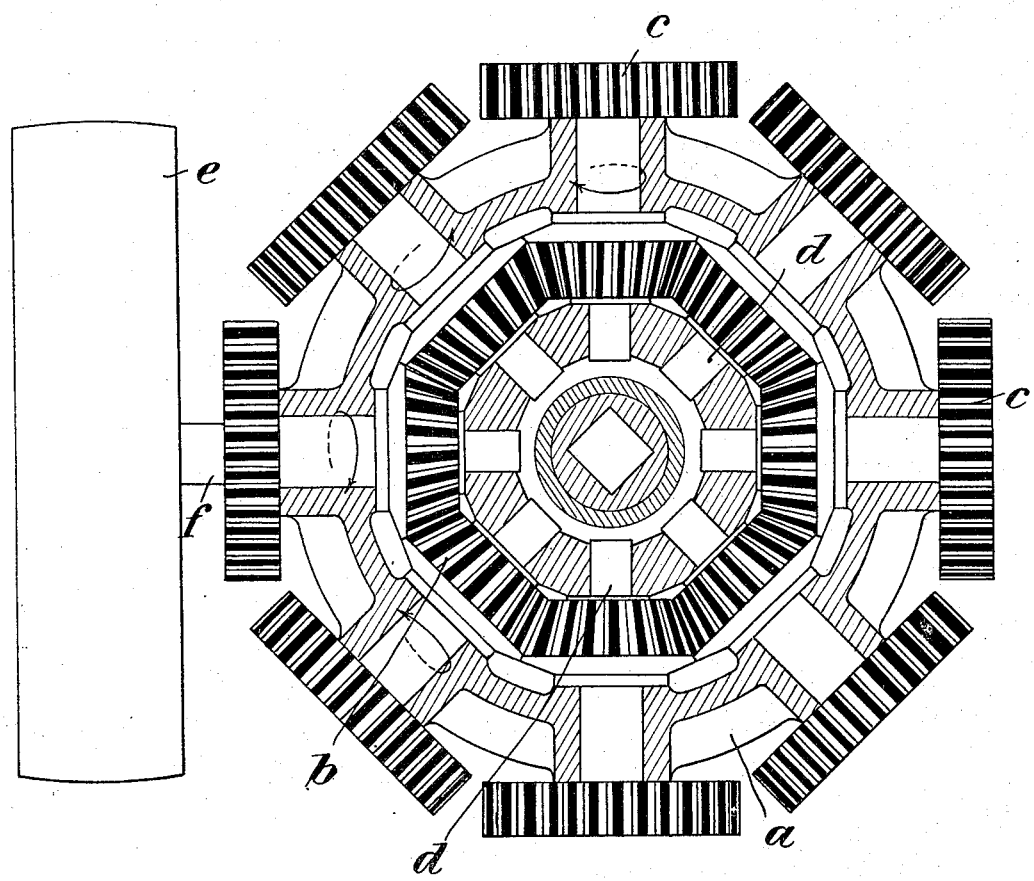
Figure 2:
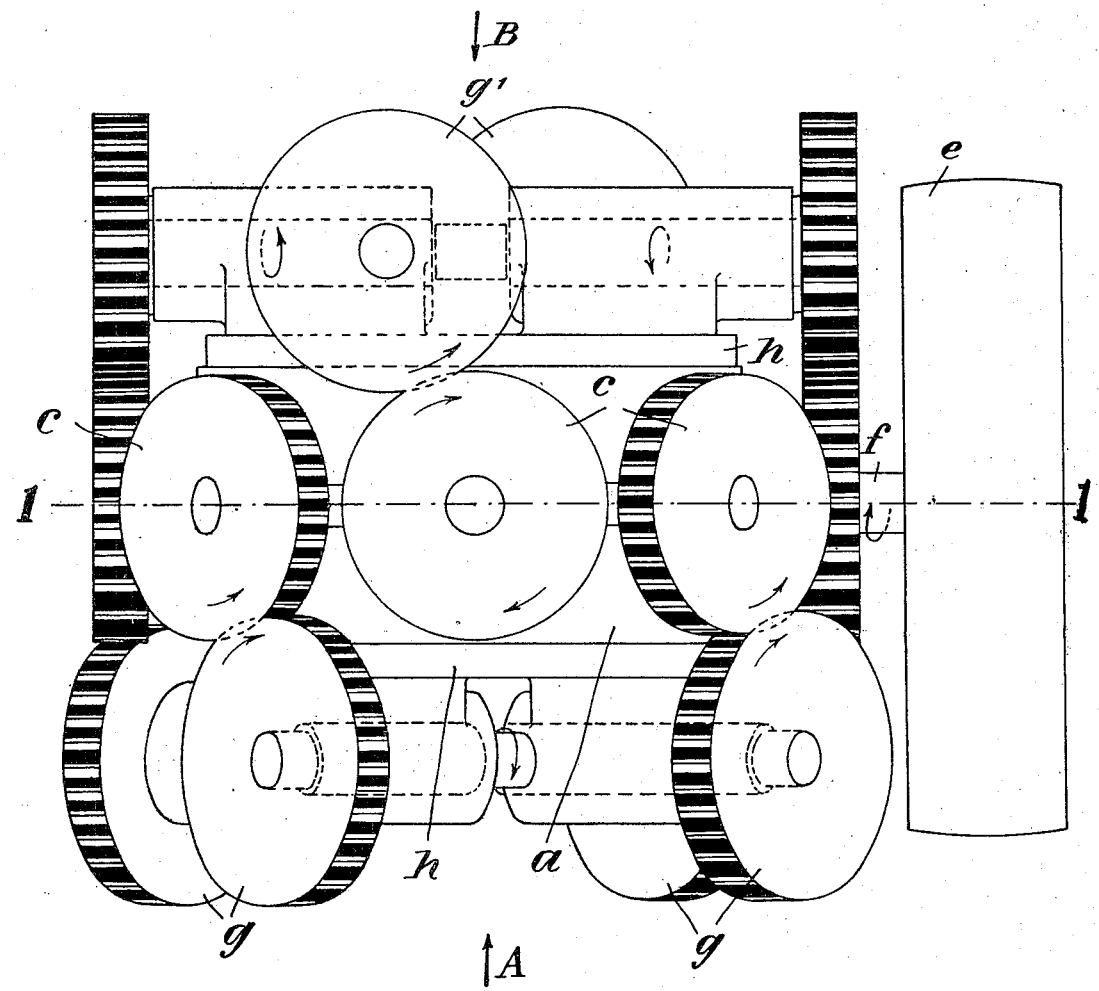
Fig. 2 is a plan view of the spindle housing and the two roll heads combined therewith.

Referring now to Figs. 1 and 2, $a$ is the spindle housing in which the shafts $d$ of the eight pinions *b* are arranged radially, the housing *a* being divided in the plane 1—1 (Fig. 2). Spur gears *c* are secured on the outer ends of the shafts *d*. One of the shafts *d*, in the present instance the horizontal shaft at the right in Fig. 1, has an extension *f* provided with a driving pulley *e*. One group of four spur gears *c* are meshing with the four spur gears *g* of one roll head *h*, while the four spur gears *c* of the other group are meshing with the four spur gears *g'* of the other head *h'*. The spur gears *g* and *g'* of the two heads are disposed at an angle of 45° relatively to one another. The heads may be secured to the housing *a* by screws *l* so as to be readily exchangeable, or cast integral with it. The necks *i*, *i'* for the rolls are shown without the rolls in Figs. 3 and 4, any kind of rolls being adapted for use with the novel arrangement.

Figure 3:
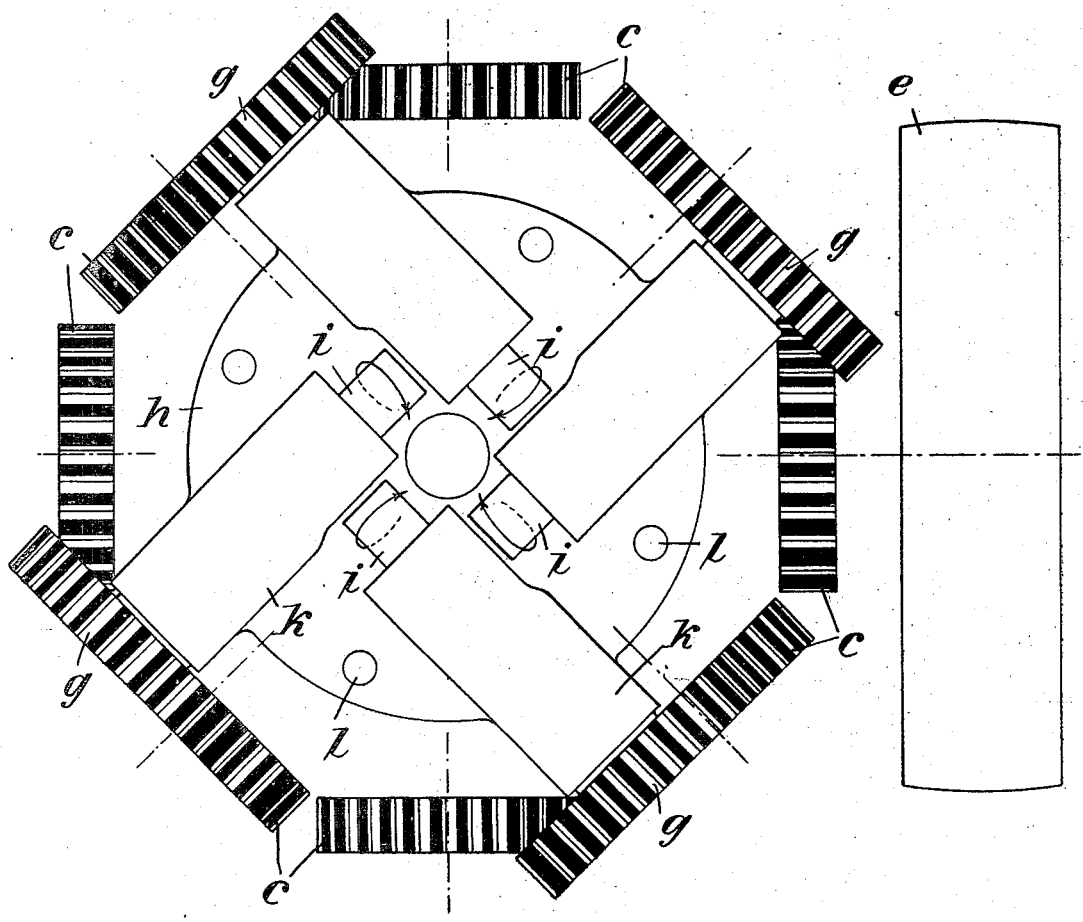
Fig. 3 is a front end elevation of one of the roll heads, viewed in the direction of the arrow A in Fig. 2.
Figure 4:
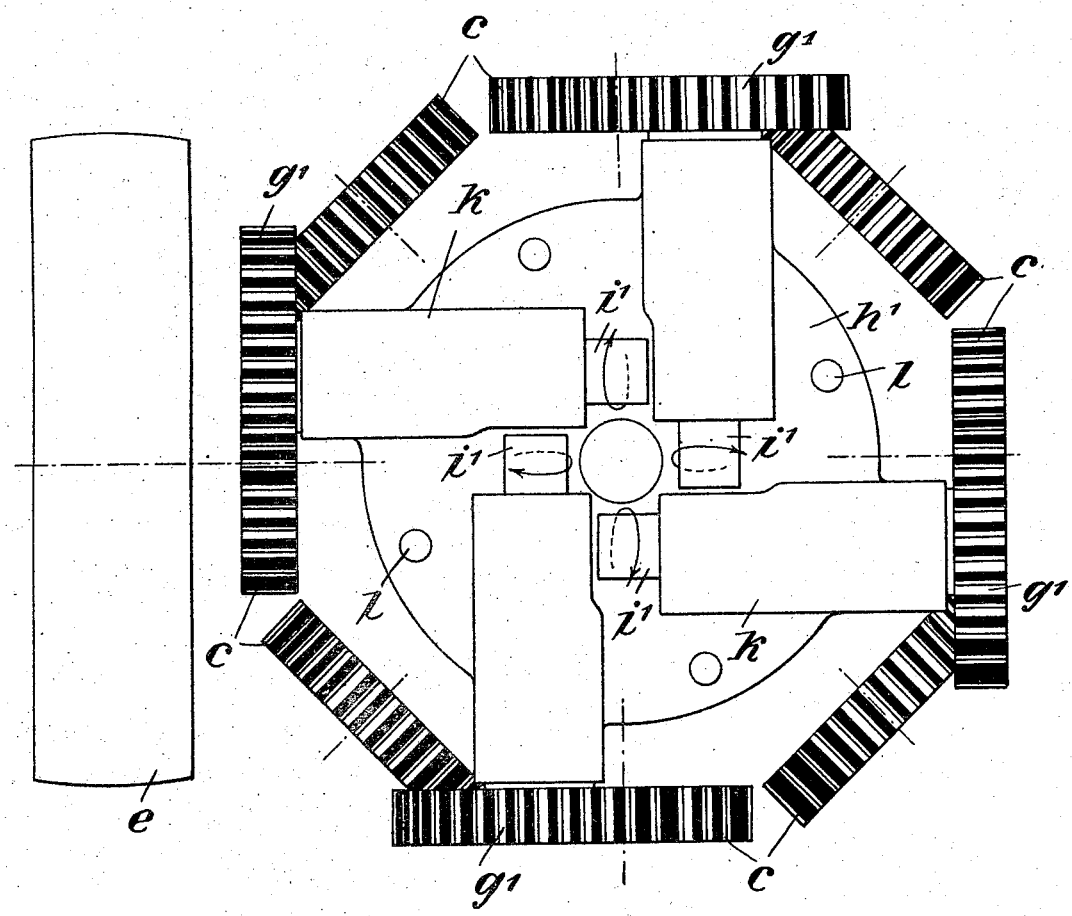
Fig. 4 is a rear end elevation of the other roll head, viewed in the direction of the arrow B in Fig. 2.

Figs. 3 and 4 show the two roll heads *h* and *h'* respectively, secured at either side of the pinions *d*. The bearing *k* for the roll shafts extend in parallel to the shafts of the pinions connected with them and are arranged at such a distance from the axis of the mill as required by the size of the rolls *i*, *i'*.

In the example illustrated I have shown only a single drive. In order to obtain the double rolling effect, a second drive might be conveniently arranged opposite the first drive. It would only be necessary to provide another shaft *d* with an extension such as indicated at *f* in Fig. 1. Such double drive, however, should only be provided where it is indispensable, as it renders access difficult where a plurality of housings are provided one to the rear of the other.

I wish it to be understood that I do not desire to be limited to the exact details of construction shown and described, for obvious modifications will occur to a person skilled in the art.

I claim:

A rolling mill comprising in combination, a spindle housing, a plurality of substantially radially arranged pinion shafts located in said housing, spur wheels on the outer ends of said shafts and a set of substantially radially arranged rolls on either side of said set of pinion shafts, alternate spur wheels meshing with rolls of one and the other set, respectively.

In testimony whereof I affix my signature.

HEINRICH STÜTING.